C. Mack,
Gate.
No. 92,329. Patented July 6, 1869.

Witnesses:
Wallis D. Long
Jos. J. Rupton

Inventor:
C. Mack
by his Atty
S. S. Fahnestock

United States Patent Office.

CHRISTIAN MACK, OF LEIPSIC, OHIO.

Letters Patent No. 92,329, dated July 6, 1869.

---

IMPROVEMENT IN GATES.

---

The Schedule referred to in these Letters Patent and making part of the same.

---

*To all whom it may concern:*

Be it known that I, CHRISTIAN MACK, of Leipsic, county of Putnam, in the State of Ohio, have invented a new and improved Gate; and I do hereby declare that the following is a full and exact description of the same, reference being had to the accompanying drawings, making a part of this specification, in which like parts are indicated by like letters in the several drawings.

The nature of my invention consists in the arrangement of certain devices by which the gate may be opened and closed automatically by the action of the fore wheel of vehicles in passing in and out.

To enable others skilled in the art to make and use my invention, I will proceed to describe its construction and operation.

In the drawings—

Figure 1:
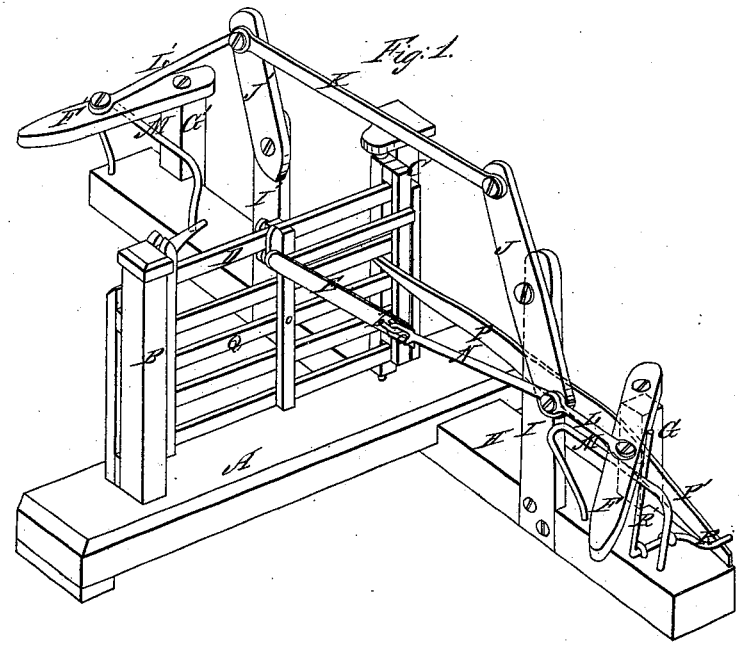
Figure 1 represents a view in perspective of a farm-gate, embracing my improvements, the gate being shown as closed.
Figure 2:
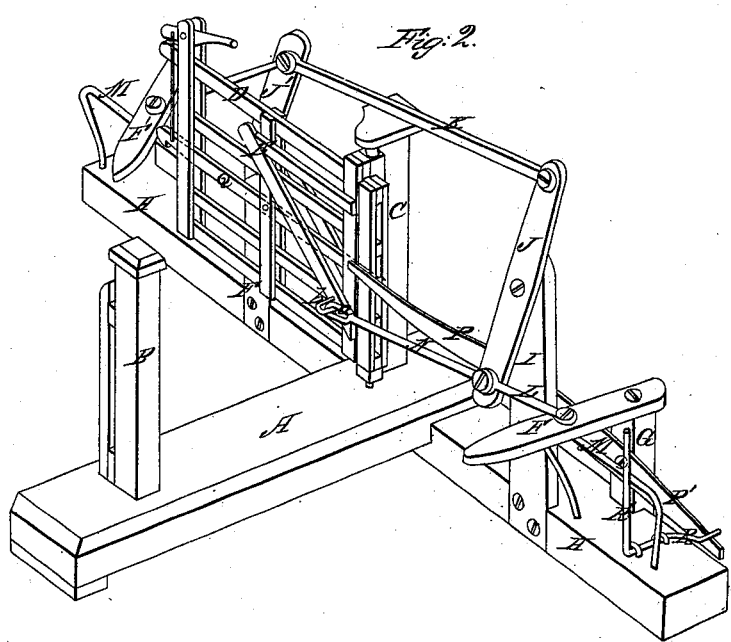
Figure 2 represents a similar view, the gate being shown as open.

A represents the gate-sill, and B C the vertical posts attached thereto.

The gate D and the pivoted upright crane or swinging frame E, with its latches and rollers, to allow the gate to be slid open for the passage of pedestrians and horsemen, are constructed, arranged, and operated substantially as shown and described in my patent of October 1, 1867, and need not, therefore, be further described.

The devices of my improvements consist of two horizontal arms, F F', pivoted respectively to two vertical posts, G G', located on the inside and outside of the gate, and in a line nearly parallel with the pivoted post C of the swinging gate.

The posts G G' of the pivoted arms are secured to a longitudinal sill, H, to which are also secured two other vertical posts, I I', to the upper ends of which are secured by pivots, two bars, J J'.

The upper ends of these bars are united by a connecting-rod, K, and are also connected to the horizontal pivoted arms J J' by rods L L'.

The acting-ends of the horizontal pivoted arms F F' are supported by ways, M, on which they move back and forth in opening and closing the gate.

The horizontal pivoted arm F, located on the outer side of the gate, is connected to the lower end of the pivoted bar J by the rod L, while the inside pivoted horizontal bar F' is united to the top of the inside pivoted bar J', as shown in the drawings, and these horizontal pivoted arms are arranged so as to project within the line of the gate a sufficient distance that the front wheel of the vehicle, passing in or out, will come in contact with their projecting ends, and cause them to turn upon their pivots, so as to allow the vehicle to pass them.

The lower end of the outside pivoted bar J, in addition to being connected to the horizontal pivoted arm F, is also united to the swinging crane E, by which the gate is supported by means of a connecting-rod, N.

This connection with the swinging crane is made in such manner as to admit of a slight movement before the horizontal pivoted arm, through its connecting-rod, commences to open or close the gate, for a purpose to be presently described.

The gate being latched, it will be observed that the action of the vehicle against the pivoted arms F F' could not, of itself, open and close the gate.

To accomplish this, I arrange a latch-lifter, P, on the outside of the gate, the outer end P' of which is pivoted to the post G, beneath the horizontal pivoted arm F, in such manner that its long end projects toward the gate, and passes between the slats thereof, in such position as that it may fall upon and depress the rear end of the latch Q, pivoted to the middle of the length of the gate, in order to raise the front end of said latch Q, while the rear or short end P of said latch-lifter extends back of the post to which it is pivoted a sufficient distance to receive the action of a crank-locking arm, R.

This crank-locking arm is hinged to the longitudinal sill H in such a position that its crank-end will rest upon the short projecting end of the latch-lifter P', while the other, or vertical branch R' of the locking-arm, rises so as to be in contact with the horizontal pivoted arm F, against which the wheel acts to open and close the gate.

When the gate is closed, the said vertical arm of the locking-crank R' is in contact with the horizontal pivoted arm F, while the crank R of said locking-arm rests upon the short end P' of the pivoted latch-lifter, thereby lifting the long end thereof, so that in this position of these parts the gate remains latched.

To unlatch the gate, the crank R must be released from the short end P' of the pivoted latch-lifter, to allow its long end P to descend, by its own weight, upon the rear end of the pivoted latch Q; and the weight of that end of the latch-lifter must be sufficient to raise and unlatch the front end of the latch of the gate.

To effect this, the connecting-rod N is provided, at its inner end, with a slot, *a*, which interlocks with a staple, *b*, secured in the hinged supporting-crane E of the gate, in such manner as to admit of a sufficient play or movement of either of the horizontal pivoted arms F F' to release the upright arm R' of the crank R from its locked position against the outside horizontal pivoted arm F, and thus allow the said short end P' of the latch-lifter to rise, by the weight of its forward end, which descends upon the rear of the latch Q of the gate, so as to unlatch it, and allow the gate to be opened.

The vehicle, in approaching the gate, strikes either arm F F', unlocks the crank-arm R by advancing, presses against and turns either of the horizontal arms, pushing the gate open by contact with one, and closing the same, as it passes in or out, by contact with the other, in either direction.

The vertical branch R' of the locking crank-arm R is released by the horizontal pivoted arm F, to unlatch the gate in opening the same, and is operated by said horizontal pivoted arm F to lift the long end P of the latch-lifter, when the gate is being closed, by depressing its crank-end R, so as to raise the long end of the latch-lifter from contact with the latch.

A vehicle passing out through the gate, will, by contact with the inside horizontal pivoted arm F', operate, through the connecting-rods L' and K, to unlock, unlatch, and open the gate, the horizontal pivoted arms F F' being so arranged and connected, that while one is operated to unlatch and open the gate, the other will operate to close and latch the gate, all by the action of the passing vehicle.

The turning of the outside pivoted arm F towards the gate to open it, also causes the inside pivoted arm to be turned toward the gate, and thus be in a position to be turned outward, to close the gate as the vehicle passes out.

The pivoted arms are, therefore, always in a position to either open or close the gate; and their projecting ends are made round, so that the wheel may pass them easily after having turned them aside.

This improvement can be applied to any gate that is made to swing, in opening and closing, upon a vertical post.

The outside horizontal pivoted arm F' must be placed at such a distance from the gate as to allow it to be opened without interfering with approaching vehicles.

Having thus described my invention,

What I claim as new, and desire to secure by Letters Patent of the United States, is—

1. The arrangement and combination of the horizontal pivoted arms F F', the vertically-pivoted bars J J', and their connecting-rods, with a swinging gate, substantially as before described.

2. The arrangement and combination of the pivoted latch-lifter P P', the crank-locking arm R R', the horizontal pivoted arms F F', and their connecting-rods, with the slotted connection a b, with the gate, substantially as described.

CHRISTIAN MACK.

Witnesses:
J. L. SIMMERMANN,
R. THOMPSON.